Patented Oct. 24, 1922.

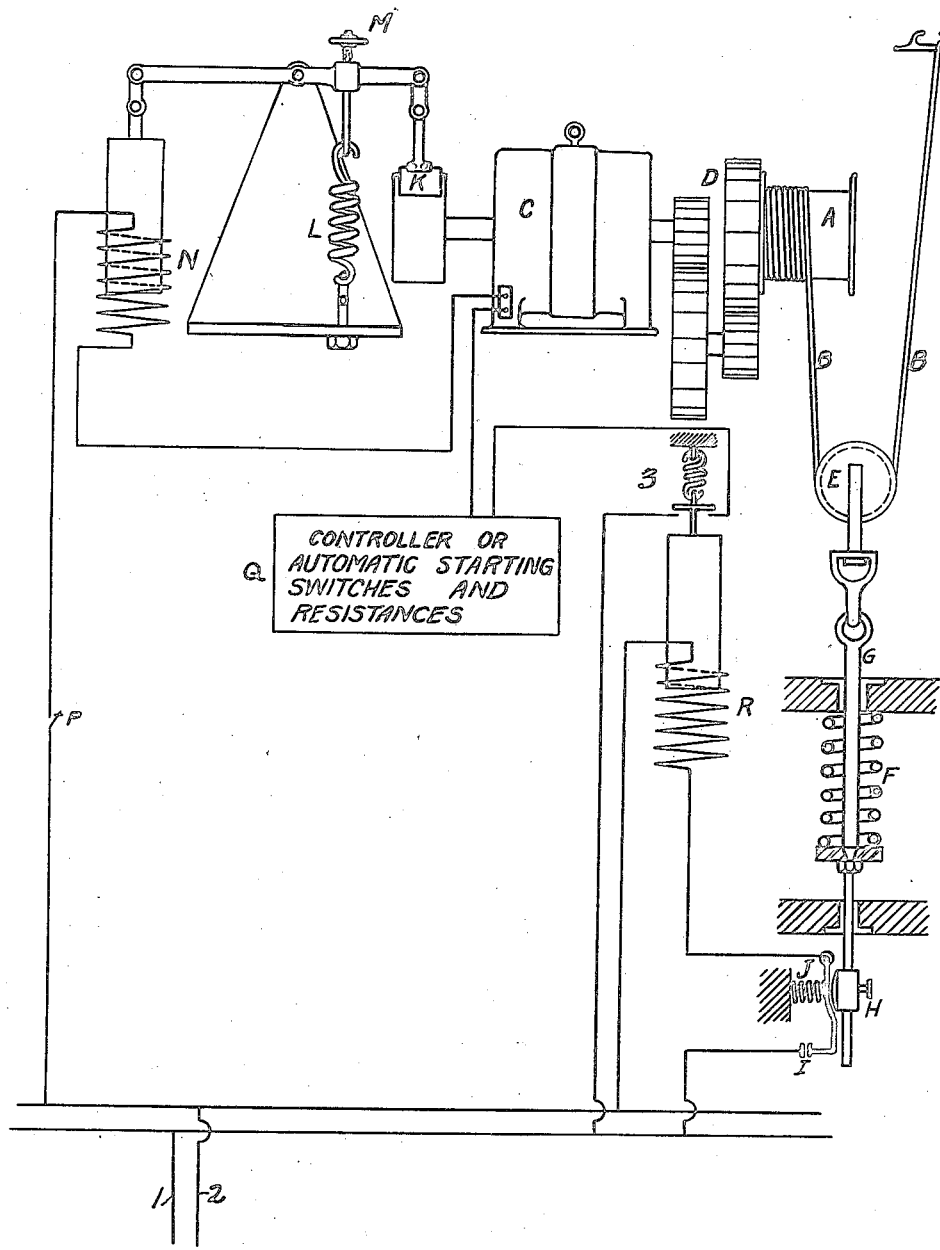

1,433,079

UNITED STATES PATENT OFFICE.

GEORGE H. JETT, OF NEW YORK, N. Y.

ELECTRIC MOORING AND TOWING GEAR APPARATUS OR SYSTEM.

Application filed April 4, 1921. Serial No. 458,600.

*To all whom it may concern:*

Be it known that I, GEORGE H. JETT, a citizen of the United States, residing at New York, in the county of New York and State of New York, have invented certain new and useful Electric Mooring and Towing Gear Apparatus or System, of which the following is a full, clear, and exact description.

This invention relates to devices for automatically maintaining a substantially constant pull or tension on a mooring or towing line and particularly as applied to marine mooring and towing, although certain features thereof are of general application and may be used with advantage in hauling, hoisting, etc.

One object of my invention is to provide an effective electric apparatus to maintain automatically an adjustable pull or tension on a line, rope, chain, cable or hawser used for mooring a vessel or other floating object in any fixed position or for towing a vessel or other object whereby undue strains and consequent injury to the mooring or towing devices are obviated.

A further object is to devise an apparatus which is simple in construction and operation and which is of few parts and can be manufactured and assembled with a minimum of cost.

I accomplish this object, speaking generally by devising a power device which is capable of winding the mooring cable or tow line up and placing the same under the desired tension, an automatic means which is responsive to the slack or tightening of the cable for effecting control of the power device, and separate means, also under the control of the automatic means and the power device and cooperating therewith for permitting the power device to pay out the cable and thereby limiting the maximum tension to a harmless value.

More specifically my improvements, according to the present embodiment consist essentially of an electric motor driven drum or spool used for winding or unwinding the line or cable upon which an adjustable constant or fixed tension is to be maintained within certain limits, a sheave or pulley attached to or mounted on springs or hydraulic cylinders permitting the sheave or pulley to move proportionally to the elongation or compression of the springs or hydraulic cylinders, and over or through which said sheave or pulley, said line or cable is led or rove, and adjustable electrical contact-making device actuated by the movement of said springs or hydraulic cylinders, which contact-making device controls the motor circuit and thereby the operation of the electric motor driving said drum or spool, and an adjustable friction brake, electro-magnetically released and mounted on one of the shafts of said electric motor driven drum, the electromagnet being connected electrically in series with said electric motor so that when the contact-making device starts the motor the brake is released to permit tightening of the cable and when the motor is not operating the brake is operating to hold the drum and maintain the tension below a predetermined value.

For a better understanding of the aforesaid novel features of my invention and others which will hereinafter appear, reference is hereby made to the accompanying drawing which illustrates diagrammatically one means of application of my improvements.

Referring to the drawing, A designates a drum or spool upon which is wound a portion of the line or cable B in tension. C designates an electric motor preferably of the direct current series type, which operates the drum and is capable of putting the cable B under the maximum tension desired in practice. As one means of connecting the motor to the drum, gears are shown at D to give speed reduction from electric motor to drum. E designates a pulley or sheave over which line or cable B is led, the pulley being attached to a compression spring F mounted on the rod G, the lower end of the spring engaging a collar carried by the rod G and the upper end engaging an abutment, as illustrated. An adjustable projection H on the movable rod is adapted to actuate an electric switch I closing same when tension on line B is sufficiently removed to allow spring F to expand to a predetermined point. A small spring J opens the switch I when the tension or tightening of cable B compresses spring F sufficiently to move projection H out of path of switch. Projection H is adjustable in location up and down rod G so that the tension at which switch is closed and opened can be regulated and adjusted to suit the particular requirements. Switch I when closed causes the electric motor C to be connected to a main line or source of electric energy 1 and 2, the motor circuit leading through solenoid N, controller Q and contactor switch 3, and the control circuit leading through the solenoid R of this switch. The motor thereupon winds up line B on drum A until the tension or pull compresses spring F to the point where switch I opens, thus disconnecting motor C from the source of electric energy. K designates a mechanical holding and tension limiting brake shown connected to the shaft of motor C as one means of applying a holding brake to drum A. The brake may comprise a shoe or plate which is mechanically held in frictional engagement with the pulley or disc mounted on the motor shaft by a spring L, the tension of the latter being adjustable in order to adjust for the desired maximum tension of the line B. This adjustment is diagrammatically shown as screw M. A solenoid N, the electric coil of which is connected in the same circuit with the motor C and contactor 3 and is simultaneously energized, overcomes the pull of spring L and electro-magnetically releases brake K, thus allowing motor C to operate without overcoming brake friction.

The operation may be described as follows:

The tension of spring L is adjusted with screw M so that brake K will hold the motor shaft up to desired tension in line B and if tension exceeds desired amount the brake will slip thereby allowing line B to unwind from drum A until the tension falls to the normal point determined by the spring L and the brake K. Assuming first that there is no tension on line B the compression spring F is expanded, drawing down the rod G and causing the switch I to close and thereby energizing solenoid R of contactor 3. If now master switch P is closed the electric motor C and magnetic solenoid N will be simultaneously energized and the motor will operate with the brake K released and will wind up line B on drum A until a tension is reached that will compress spring F and open switches I and 3. Motor C will stop and brake K will hold. If tension on line B remains constant, apparatus operates no further. If tension increases brake K slips and line is payed out until tension again is normal. If tension is decreased spring F expands, switches I and 3 are closed and electric motor C again winds up line B until tension is normal. By adjusting the member H up and down on rod G, the apparatus can be set to operate at any desired tension or pull on line B.

It is understood that the drawing accompanying this application is merely diagrammatic and is for illustrative purposes only, and that the relation and construction of the various parts may be varied to suit the particular requirements without departing from the spirit of the invention. For example, the rod G and spring F are described as vertically disposed whereas in practice, they might assume any other position or angle, and similarly with regard to various other elements of the apparatus.

In accordance with the patent statutes, I have set forth one complete embodiment of my invention in the specific manner required thereby, but it is understood that the claims annexed hereto are not to be construed as limited to the specific devices illustrated, except, as is specificially recited therein or is rendered necessary by a consideration of the prior art, but are to be given a construction commensurate with the scope and spirit of the improvements.

What I claim and desire to secure by Letters Patent is:—

1. In a mooring or towing gear system the combination of a mooring or tow line whose tension is to be controlled, a drum about which said line is adapted to be wound up to a certain tension and from which said line is to be paid out under greater tension, an electric motor adapted to wind up the line and put the same under tension, automatic means responsive to the tension of the line and operative to effect control of the motor circuit to cause the motor to wind up the line to a predetermined tension, and an electro-magnetically released brake under the control of the automatic means and operative to limit the tension in the line to a predetermined value, and permit the motor to pay out the line when a predetermined maximum tension is reached and until the tension is again normal.

2. In a system of the character set forth the combination of a cable whose tension is to be automatically regulated and maintained, an electric motor and drum for winding up and putting the cable under tension, a sheave carried by a loop in said cable, said sheave being yieldingly mounted by means of a spring in opposition to the tension or pull of the cable, a mechanical brake frictionally engaging the motor shaft and limiting the maximum tension of the cable, an electro-magnet for releasing the brake, a main line circuit, a motor circuit leading from the main line through the motor and the electro-magnet, a solenoid operated contactor switch in the motor circuit, a control circuit leading through the solenoid of the contactor, a control switch in said control circuit, and an adjustable device carried by the sheave for actuating the control switch.

3. In a system of the character set forth, the combination of a cable whose tension is to be automatically regulated and maintained, an electric motor and drum for winding up and putting the cable under tension, a sheave carried by a loop in said cable, said sheave being yieldingly mounted by means of a spring in opposition to the tension or pull of the cable, a mechanical brake frictionally engaging the motor shaft for holding the tension of the cable, an electro-magnet for releasing the brake, a main line circuit, a motor circuit leading from the main line through the motor and the electro-magnet, a solenoid operated contactor switch in the motor circuit, a control or pilot circuit leading through the solenoid of the contactor, a control switch in the pilot circuit, and a device carried by the sheave for actuating the control switch.

4. In a system of the character set forth the combination of a cable whose tension is to be automatically regulated and maintained, an electric motor and drum for winding up and paying out the cable, a mechanical brake frictionally engaging the apparatus for holding the tension of the cable, an electromagnet for releasing the brake, a main line circuit, a motor circuit leading from the main line through the motor and the electromagnet, a solenoid operated contactor switch in the motor circuit, a control circuit leading through the solenoid of the contactor, a control switch in the control circuit and a device responsive to the tension of the cable for actuating the control switch and effecting the simultaneous control of the motor and the electromagnet.

In testimony whereof, I have hereunto set my hand this 29th day of March, 1921.

GEORGE H. JETT.